(12) United States Patent
Cashmore et al.

(10) Patent No.: US 9,380,013 B1
(45) Date of Patent: Jun. 28, 2016

(54) IDENTIFYING A SECOND MEDIA CONTENT TO GO VIRAL BASED ON A VELOCITY THRESHOLD OF A FIRST MEDIA CONTENT

(71) Applicant: Mashable, Inc., New York, NY (US)

(72) Inventors: Peter Cashmore, New York, NY (US);
Robyn Peterson, New Canaan, CT (US);
Chris Heald, Gilbert, AZ (US); Dimitri Dimoulakis, New York, NY (US);
Mario Antonetti, Manchester, NH (US);
Kevin Gisi, New York, NY (US);
Darren Tome, New York, NY (US);
Stacy Martinet, New York, NY (US);
Adam Ostrow, New York, NY (US)

(73) Assignee: Mashable, Inc., New York, NY (US)

( * ) Notice: Subject to any disclaimer, the term of this patent is extended or adjusted under 35 U.S.C. 154(b) by 161 days.

(21) Appl. No.: 14/086,094

(22) Filed: Nov. 21, 2013

(51) Int. Cl.
*G06F 15/16* (2006.01)
*H04L 12/58* (2006.01)
*H04L 29/06* (2006.01)
*G06F 17/22* (2006.01)
*G06F 17/21* (2006.01)

(52) U.S. Cl.
CPC .............. *H04L 51/10* (2013.01); *G06F 17/212* (2013.01); *G06F 17/2211* (2013.01); *H04L 65/60* (2013.01)

(58) Field of Classification Search
CPC . H04L 12/58; H04L 29/08198; H04L 65/601; H04L 2209/60; H04L 12/2498; H04L 12/587; G06Q 30/02; G06Q 30/0272

USPC .......................................................... 709/206
See application file for complete search history.

(56) References Cited

U.S. PATENT DOCUMENTS

| | | | | |
|---|---|---|---|---|
| 8,332,512 | B1 * | 12/2012 | Wu ................... | G06Q 30/0254 705/319 |
| 8,650,488 | B1 * | 2/2014 | Wattenhofer ....... | G06Q 30/0201 715/716 |
| 8,688,515 | B2 * | 4/2014 | Razzaque ............ | G06Q 30/02 705/14.1 |
| 2008/0313011 | A1 * | 12/2008 | Rose ................... | G06Q 30/02 705/7.32 |
| 2012/0239489 | A1 * | 9/2012 | Peretti .................. | G06Q 30/02 705/14.45 |
| 2013/0086159 | A1 * | 4/2013 | Gharachorloo et al. ...... | 709/204 |
| 2013/0117349 | A1 * | 5/2013 | Burnette ............. | G06Q 30/0202 709/202 |
| 2013/0166390 | A1 * | 6/2013 | Blow ................... | G06Q 30/02 709/219 |
| 2014/0032683 | A1 * | 1/2014 | Maheshwari et al. ........ | 709/206 |
| 2015/0067048 | A1 * | 3/2015 | Kannan ............... | H04L 65/40 709/204 |

* cited by examiner

*Primary Examiner* — Yves Dalencourt
(74) *Attorney, Agent, or Firm* — Morris & Kamlay LLP

(57) ABSTRACT

Systems and techniques are disclosed for transmitting a message via one or more platforms, the messages being associated with media content and/or related media content. A related media content may be identified based on the media content and a platform may be selected based on a platform selection criteria. The message may correspond to the related media content and may be transmitted to the platform.

17 Claims, 7 Drawing Sheets

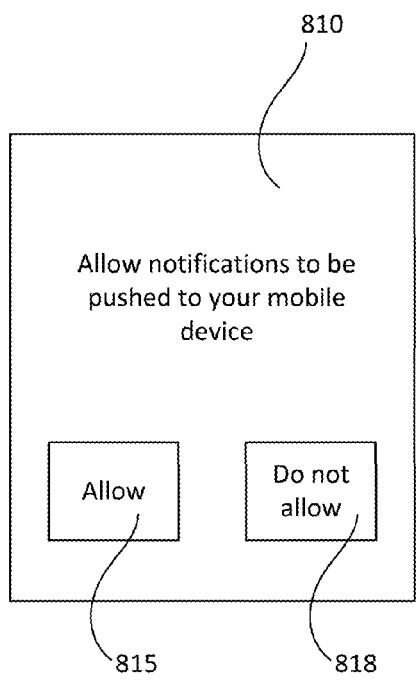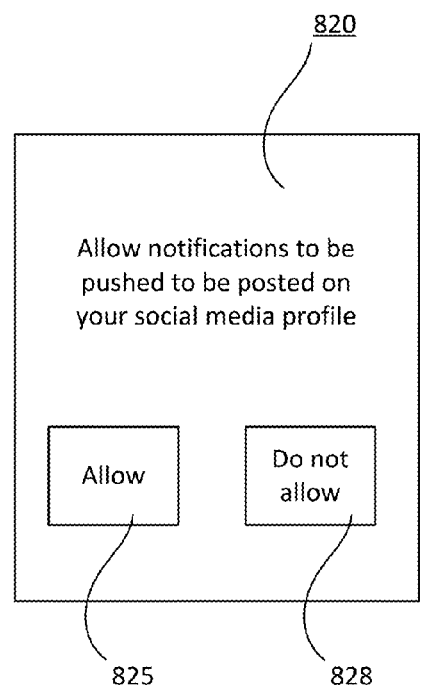
Fig. 8a
Fig. 8b

IDENTIFYING A SECOND MEDIA CONTENT TO GO VIRAL BASED ON A VELOCITY THRESHOLD OF A FIRST MEDIA CONTENT

BACKGROUND

Millions of media items are published on a daily basis, but only a relative handful become wildly popular. The popularity of a media item (or "media content") can be related to how many different places it is published and how frequently it is provided to users, posted, forwarded, marked as important or otherwise shared by users. Extensive sharing of a media item can benefit from the so-called "network effect," whereby a person can share a media item with several friends, each of whom can share it with several friends and so on. A media item that is widely shared and gains a high degree of popularity due to the network effect is said to have gone "viral," and may be called a "viral media item". The message may contain an identifier corresponding to a member of a social network, may include an account credential corresponding to an account on a social network, or the like. Alternatively or in addition, an identifier may be an email address, a telephone number, an online account name, a short messaging service address, and an application address

BRIEF SUMMARY

According to implementations of the disclosed subject matter, a determination that a velocity measure corresponding to a first media content exceeds a velocity threshold may be made. The velocity threshold may be based on a change in engagement rate for the first media content. A second media content may be identified based on the first media content and a platform may be selected based on at least one platform selection criteria. A message corresponding to the second media content may be generated and transmitted to the first platform.

Systems and techniques according to the present disclosure position media to go viral. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 8a shows another example illustration of allowing notifications on a user device, according to an implementation of the disclosed subject matter.

FIG. 8b shows an example illustration of allowing posting on a social media profile, according to an implementation of the disclosed subject matter.

DETAILED DESCRIPTION

Figure 1:
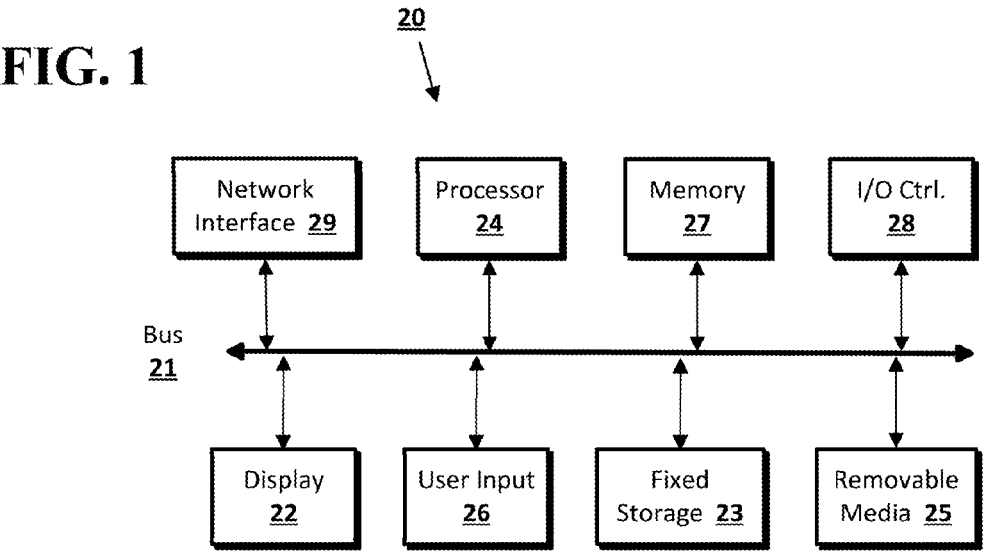
FIG. 1 shows a computer according to an implementation of the disclosed subject matter.

According to implementations of the disclosed subject matter, potentially viral media content may be identified and messaged to one or more users in a way that can improve the likelihood that the content will actually go viral. The messaging may include a related content related to the identified media content. A platform via which to transmit a message may be identified based on one or more platform selection criteria, as disclosed herein. A platform may be any applicable outlet such that a message can be received by the platform and may be viewed or applied by one or more users. As an example, a platform may be a social media website that contains profiles associated with members of the webpage. A user may receive a message via the social media website and the message may either be a private message or a public message. A related content, as described herein, may be any applicable content that is related to an original media content and may be a derivative of the original content, contain a portion of the original content, contain a link to the original content, or the like. The arrangement may transmit the message to the platform once the platform has been identified and may transmit a message to multiple platforms based on the platform selection criteria. For example, a social media website may be selected based on a first platform selection criteria and a user's mobile device may be selected based on a second platform selection criteria. Accordingly, a single message or two different messages may be transmitted to both the social media website as well as the user's mobile device.

According to implementations of the disclosed subject matter, the potentially viral media content may be identified by scanning one or more media sources. The media sources may be web pages, blogs, article publication websites, news websites, social media sites, or the like. A media source may be identified based on one or more criteria such as a predetermine selection, a sub source found within an original media source, or the like. Media content within the media source may be identified based on discovery criteria such as an engagement rate (e.g., number of times the content has been shared, viewed, otherwise accessed, etc.) and the arrangement may calculate a velocity measure associated with the media content, as disclosed herein. The velocity measure may be based on a change in engagement rate for the media content. For example, the velocity measure may represent the change in shares per time unit for the media content. The arrangement may determine that the velocity measure for the media content exceeds a velocity threshold and, based on the determination, may take a subsequent action such as publishing related media content. The velocity threshold may be predetermined (e.g., a value such as 5 shares per minute), may be dynamically determined by the arrangement based on either the type of media content (e.g., image, video, text, etc.) or engagement rate (e.g., share, mention, etc.) or by aspects of the share behavior observed (e.g., type of users sharing, or amount and frequency of resharing). A publication of related media content may be an article or snippet derived from the media content such as an article about the media content, or any other applicable related media content as disclosed herein.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. The fixed storage may store one or more, media content, URL links, related media content, velocity measure, engagement rate, change in engagement rate or the like. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected or communicated with in a similar manner (e.g., mobile devices, document scanners, image scanners, BLUETOOTH™ devices, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
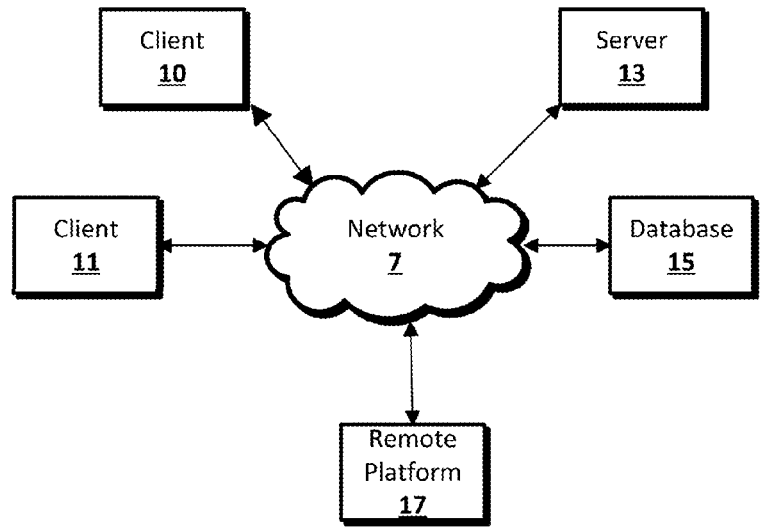
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, Blu-ray™ discs, DVD discs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
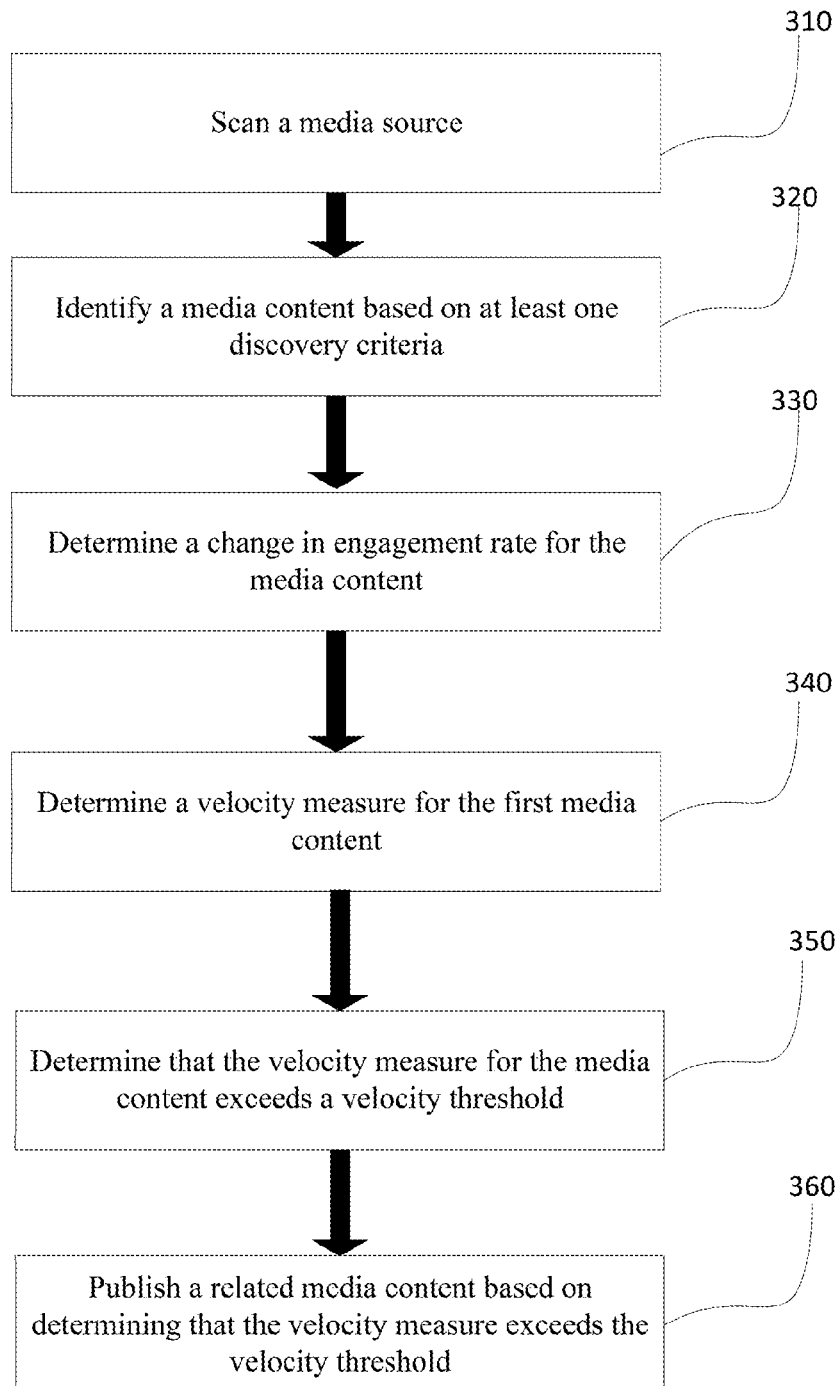
FIG. 3 shows an example process for publishing related media content, according to an implementation of the disclosed subject matter.

As shown in FIG. 3, at step 310, the arrangement may scan a media source such as a website or a blog. At step 320, the arrangement may identify media content based on at least one discovery criteria and, at step 330, may determine a change in engagement rate for the identified media content. At step 340, a velocity measure for the media content may be determined and may be based on the change in engagement rate. The velocity measure may be derived from the change in engagement rate in any applicable manner such as by adding one or more weights to the change in engagement rate. At step 350, the arrangement may determine that the velocity measure for the media content exceeds a velocity threshold and, based on this determination, at step 360, may publish related media content. The related media content may be any applicable content as disclosed herein, such as content derived based on the media content.

According to implementations of the disclosed subject matter, as shown in FIG. 3 at step 310, the arrangement may scan a media source. A media source may be any applicable source such as a website, a blog, an aggregation page, an application, or the like. The source may be a news related source, entertainment related source, educational source, social media source, community form (e.g., a forum where members of the community provide content to the forum such that other members are provided access to the content via the forum), a comment (e.g., the source may be a comment on a forum, the comment submitted by a user in response to a news article to which the user responds to), a response (e.g., to a comment, to media content, etc.), or the like.

The arrangement may identify a media source to scan based on any applicable criteria such as a previously or currently identified media source by a human (e.g., a user may provide a media source for the arrangement to scan, a user may provide a type of media source for the arrangement to scan, etc.), or computer (e.g., a media source may be automatically identified based on parameters such as threshold traffic values, click through, amount of time spent on a page, or the like). The arrangement may further identify a second media source based on a first, initial, media source. The second media source may be extracted by identifying a connection to the second media source from the first media source. As an example, a first media source may contain links to other webpages. The arrangement may detect these links and designate the destination webpage corresponding to the one or more links as a media source.

One or more media source locations may be stored by the arrangement such that the one or more locations are accessible at a later time. Continuing the previous example, the second media source may be identified by the arrangement via the first source during a first time. The arrangement may store the location of the second media source (e.g., via a URL). At a second, subsequent time, the arrangement may access and scan the second media source based on the stored location.

According to an implementation of the disclosed subject matter, as shown at step 320, media content may be identified based on any applicable discovery criteria. The media content may be any applicable content such as an image (e.g., a JPEG, PNG, TIF, BMP, etc.), a video (e.g., an MPEG, AVI, MOV, etc.), an audio (e.g., a MP3, MP4, WAV, etc.), a graphics interchange format, a text string (e.g., an article, comment, blog post, an expert, a, paragraph, a sentence, a title, etc.) or the like. As a specific example a media content may be a video related to a user's experience in New York City posted by the user to a video sharing website. Additionally, a second user may provide a comment in association with the video regarding her experience in the same areas of New York City that are depicted in the video. Both the video and the comment may be identified as media content. Alternatively, the video may be identified as media content or the comment may be identified as media content. It will be understood that although specific examples of media content are provided herein, the implementations are not limited to those examples as any applicable media content may be identified by the arrangement.

Discovery criteria may be any applicable criterion that enables the arrangement to identify the media content as potentially viral content. The discovery criteria may be a threshold amount of engagement such as views, clicks, shares, posts, likes, suggestions, links to, and mentions of a given media content. As a specific example, the arrangement may track the number of times the link to an image has been posted across social media websites. If the number of times meets or exceeds a predetermined threshold, then the arrangement may identify the media content and track its engagement rate, as disclosed herein. Alternatively, the discovery criteria may be whether a given content is related to one or more of interest topics. The arrangement may be provided with or may determine of interest topics based on any applicable criteria such as current events (e.g., a sporting event), currently trending topics (e.g., a musical performance aired on television), topics that will become relevant based on anticipated events (e.g., a pending election), or the like. Accordingly, media content may be identified based on the topic that the content is associated with. As a specific example, a user may instruct the arrangement to flag content that is related to a financial crisis that may occur if certain actions are not taken by a national government within two days. Accordingly, the arrangement may scan a media source that contains an article which contains detailed analysis regarding the pending financial crisis by an expert in the field. Accordingly, the arrangement may identify the media content based on the user provided discovery criteria (e.g., content that is related to the financial crisis). As another example, the discovery criteria may be a threshold number media sources which contain links to the media content. More specifically, the arrangement may identify media content if the media content is linked to in a threshold number of media sources (e.g., at least 5 distinct sources).

At step 330, the arrangement may determine a change in engagement rate for the identified media content. An engagement rate may be a measure of a number of clicks, shares, likes, suggestions, posts, mentions, or the like. A click may be selection of the media content or a link to the media item by a user. Here, the arrangement may process the clicks through fraud detectors such that illegitimate clicks are ignored (e.g., via bot detection software). A share may be associated with one or more users providing the media content to one or more other users. A share may occur via any applicable manner such as via an electronic mail, an account user interface, a website, a social media platform, Short Messaging Service message, software, an application, or the like. As an example, a first user may view the media content via a social media platform and select an option to place a link for the media content on a page associated with another user within the same social media platform. A like may be associated with a user approval of, agreement with, and/or support towards media content. As an example, a user may select an icon associated with a media content to indicate agreement with the message provided by the media content. The selection may be visually presented to the user and/or other users as associated with the media content. A suggestion may be a recommendation of media content by a user. The suggestion may be directed at one or more other users or may be directed to a general population. A user may suggest specific media content to another user via any applicable manner such as via an electronic mail, an account user interface, a website, a social media platform, Short Messaging Service message, software, an application, or the like. As an example, a user may submit a link for media content to a second user's social media page. A post may be a publication of media content by a user such that one or more other users may view the publication. As an example, a user may post a link to media content on the user's social media page such that the post is seen by other users that are connected to the original user. A mention may be any applicable reference to media content and may be embedded within text, a share, a suggestion, a post, or the like. As an example, a user may provide a status via an instant messaging service. The status may include text along with a link to media content.

The arrangement may detect the engagement rate in any applicable manner such as by monitoring instances of the media content, monitoring instances of links to the media content, monitoring one or more sources (e.g., websites, blogs, etc.) via which a user may engage with the media content, or the like. As an example, the arrangement may track one or more social media websites and detect whenever a link to an article is posted via the social media website. Each post and/or a selection of link to the article may be designated as an engagement. The engagement may be recorded by the arrangement and stored at any applicable storage device such as a local server, a remote server, a cloud based server, a database, or the like. The arrangement may detect the engagement rate for given media content for a limited amount of time. The time may be determined based on a change in engagement rate, as disclosed herein, a predetermined time period, a time period determined based on an original engagement rate corresponding to when the media content was identified by the arrangement, or the like. As an example, the arrangement may determine that the media content is a video and, based on a predetermined value of 3 days for videos, may store the engagement rate for the media content for 3 days. Essentially, the arrangement may determine whether a media content is a potentially viral media content and, if it is not a potential media content, may stop monitoring the media content.

Figure 5:
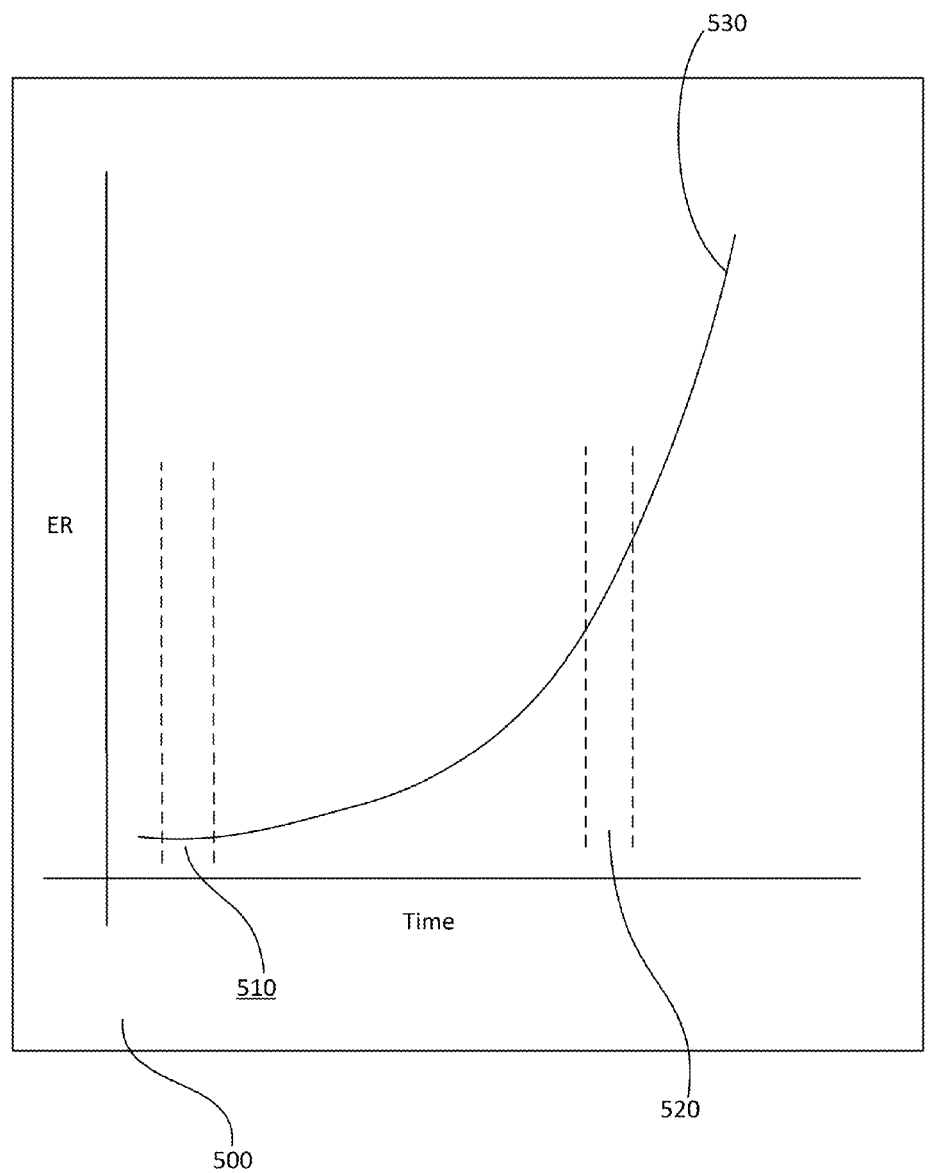
FIG. 5 shows an example illustration for change in engagement rate, according to an implementation of the disclosed subject matter.

A change in engagement rate for a media item may be calculated in any applicable manner such that an initial engagement rate is compared to a subsequent engagement rate. For example, the initial engagement rate may correspond to an engagement for a given period of time and the subsequent engagement rate may correspond to a subsequent period of time. As an illustrative example, FIG. 5 shows a graph 500 representing a rate of engagement related to a media content at a first time 510 and a second time 520 where the X axis correspond to time and the Y axis corresponds to the engagement rate for the media content. As shown, the engagement rate 530 may change at a slower pace at time 510 and a faster pace at time 520. Accordingly, the arrangement may determine the change in engagement rate based on the engagement rate at 510 and the change in engagement rate at 520. According to an implementation, the engagement rate for a first time may be based on a number of engagements during the time range corresponding to the first time. For example, the time range may be 1 minute and the number of clicks to a link recorded during a first minute may be 30. The number of clicks to a link recorded during a second minute may be 40. Accordingly, the change in engagement rate may be +10 clicks (i.e., the increase in number of clicks) or +33% (i.e., the percentage increase between the first minute and the second minute). Alternatively, the arrangement may take an average number of engagements during a first time (e.g., a first minute) and compare it to an average number of engagements during a second range (e.g., a second minute). For example, the first engagement rate may be calculated for the a first minute during which the average engagement is 3 clicks/second and a second engagement rate may be calculate for a second minute during which the average engagement rate is 4 clicks/second. Accordingly, the change in engagement rate may be +1 click/second or +25%.

The change in engagement rate may be conducted by the arrangement via any applicable entity such as a local server, a remote server, a cloud based server, a database, a computer, or the like. The change in engagement rate may be provided from a first entity to a second entity to calculate a velocity measure or, alternatively, the velocity measure may be calculated at the first entity that calculates the change in engagement rate.

According to an implementation of the disclosed subject matter, as shown at step 340 of FIG. 3, a velocity measure for a media content may be calculated and may be based on a change in engagement rate associated with the media content. According to an implementation, the velocity measure may be the change in engagement rate itself. For example, if the change in engagement rate for a media content is +1 click/second then the velocity measure for the media content may also be +1 click/second. According to an implementation, the velocity measure may be based on a normalized change in engagement rate. The change in engagement rate may be normalized based on any applicable criteria such as based on a predetermined normalization rate (e.g., if the predetermined normalization rate is 4 clicks/second then by dividing an engagement rate by 4 to determine a velocity measure), based on a current highest engagement rate (e.g., based on a media content that currently has the highest change in engagement rate, essentially resulting in a velocity measure that ranks media content in view of the media content with the highest change in engagement rate), based on an overall highest engagement rate (e.g., based on a media content that historically has the highest change in engagement rate over a given period of time), or the like. As a specific example, the highest change in engagement rate during a given day may be associated with a first media content. The change in engagement rate for a second media content may be calculated based on dividing the change in engagement rate for the second media content by the change in engagement rate for the first media content (i.e., the highest change in engagement rate for the day).

According to an implementation of the disclosed subject matter, a velocity measure may be calculated based on one or more weights associated with one or more engagement rates and/or types of engagements. A type of engagement can be based on one or more of the source (the user (the "source user") and/or the site from which the media item is shared (the "source site")) of the engagement, the destination (the target user and/or destination site to which the media is shared) of the engagement, an attribute of the media being engaged (e.g., category, topic, length, size, authorship, metadata, keywords present in the media item), etc. The weights may be assigned to the one or more weights that are used to calculate the change in engagement rate for a media content. For example, as shown in FIG. 5, if a first engagement rate at 510 at a first time is compared to a second engagement rate at 520 at a second time, then a weight may be applied to the engagement rate associated with 510, 520, or both. For example, an engagement rate associated with a first time may not be weighted whereas the engagement rate associated with a second time may receive a weight such that the engagement rate associated with the second time is counted twice as heavily as the first engagement rate. Accordingly, if the first engagement rate is 5 and the second engagement rate is 10, then a weight may be applied to the second engagement rate such that the effective second engagement rate is 20. A velocity measure may be calculated by averaging the first engagement rate (i.e., 5) and the weighted second engagement rate (i.e., 20), resulting in a velocity measure of 12.5. Notably, a non-weighted velocity measure would be 7.5 based on the first engagement rate (i.e., 5) and non-weighted second engagement rate (i.e., 10). The weight associated with a first engagement rate may be different than a weight associated with a second engagement rate for the same media content. For example, an engagement rate associated with a first time may be weighted at 2x, where 'x' is a real number, and the engagement rate associated with a second time may receive a 3x weight such that the engagement rate associated with the second time is counted 1.5 times as heavily as the first engagement rate. Accordingly, if the first engagement rate is 5 and the second engagement rate is 10, then the 2x weight may be applied to the first engagement rate such that the effective first engagement rate is 10 and a 3x weight may be applied to the second engagement rate such that the effective second engagement rate is 30. A velocity measure may be calculated by averaging the effective first engagement rate (i.e., 10) and the weighted second engagement rate (i.e., 30), resulting in a velocity measure of 20.

According to an implementation of the disclosed subject matter, the one or more weights associated with an engagement rate may be based on a recency of the one or more engagement rates. For example, a heavier weight may be applied to an engagement rate that is more recent than an engagement rate that is less recent. For example, an engagement rate calculated at 2:15 p.m., for a media content, may be weighted heavier than an engagement rate calculated at 1:15 p.m. the same day. Essentially, the arrangement may prioritize engagement rates that are more recent as they may more accurately indicate a trend in the popularity of a media content. Alternatively, a heavier weight may be applied to an engagement rate that is less recent than an engagement rate that is more recent. For example, an engagement rate calculated at 1:15 p.m., for a media content, may be weighted heavier than an engagement rate calculated at 2:15 p.m. the same day. Essentially, the arrangement may prioritize engagement rates that are less recent as they may more definitively represent the popularity of a media content.

According to an implementation of the disclosed subject matter, the one or more weights associated with an engagement rate may be based on the type of the engagement rate. A type of engagement rate may be based on any action with respect to a media item such as a click, a share, a like, a suggestion, a post, a mention, or the like. A click may be selection of the media content or a link to the media item by a user. Here, the arrangement may process the clicks through one or more fraud detectors such that illegitimate clicks are ignored (e.g., via bot detection software). A share may be associated with one or more users providing the media content to one or more other users. A share may occur via any applicable manner such as via an electronic mail, an account user interface, a website, a social media platform, Short Messaging Service message, software, an application, or the like. A like may be associated with a user approval of, agreement with, and/or support towards media content. A suggestion may be a recommendation of media content by a user. The suggestion may be directed at one or more other users or may be directed to a general population. A user may suggest specific media content another user via any applicable manner such as via an electronic mail, an account user interface, a website, a social media platform, Short Messaging Service message, software, an application, or the like. A post may be a publication of media content by a user such that one or more other users may view the publication. A mention may be any applicable reference to media content and may be embedded within text, a share, a suggestion, a post, or the like.

According to an implementation of the disclosed subject matter, the one or more weights associated with an engagement rate may be based on the type of media. A type of media may be any media type such as an image, a video, an audio, a graphics interchange format, and a text string. An image may be any applicable format such as a JPEG, a JFIF, an Exif, a TIFF, a RAW, a GIF, a BMP, a PNG, a PPM, a PMG, a PBM, a PNM, a PFM, a PAM, a WEBP, a HDR Raster, a PSD or the like. A video may be any applicable format such as an MPEG, an MPG, an MPE, a MOV, an AVI, a CAM, a DAT, an FLA, a SOL, an M4V, a WMV, or the like. An audio may be any applicable format such as a 3PG, an AIFF, an ATRAC, a M4A an M4P a TTA, a WAV, a WMA or the like. A text format may be any applicable format such as a TXT, a ASC, a CSV, a DOT, a DOTX, a HTML, an ODT, an XPS, and XML, an XHTML, a PDF, or the like.

According to an implementation of the disclosed subject matter, as shown at step 350 of FIG. 3, the arrangement may determine that a velocity measure exceeds a velocity threshold. A velocity threshold may be provided by a user or may be determined by the arrangement. A user may provide a velocity threshold in any applicable manner such as via a user interface, prior to the arrangement identifying a media content, via an interface after a media content is identified by the arrangement, or the like. For example, a user may be prompted to input a velocity threshold prior to the arrangement identifying media content. The user may input a velocity threshold of 6.5 such that the arrangement determines that a velocity measure associated with a media content exceeds the velocity threshold when the velocity measure for the media content exceeds 6.5. Essentially, media content for which the velocity measure exceeds a velocity threshold may be considered potentially viral media.

Alternatively, a velocity threshold may be determined dynamically based on any applicable criteria such as an advertising campaign, a different media content, or the like. An advertising campaign may be one or more advertisements in any applicable format (e.g., image, video, audio, text, etc.) that may be associated with media content. As a specific example, an advertising campaign for sweaters may be configured such that the sweater manufacture indicates that it will pay X amount if their advertisements are associated with media content that is very popular and relevant to sweaters. Accordingly, the arrangement may determine that media content related to clothing articles is considered to be very popular at the velocity threshold of 6.0 based on clothing article media content for the past week. Therefore, the velocity threshold may be 6.0 based on the determination. As another example, on a given day, the average media content velocity measure for identified media content may be 4.0. The arrangement may determine that a velocity threshold is 200% of the average velocity measure on a given day. Accordingly, on the given day with the average velocity measure of 4.0, the arrangement may determine that the velocity threshold is 8.0 (200% of 4.0).

According to an implementation of the disclosed subject matter, as shown in FIG. 3, at step 360, media related to the media content may be published based on determining that the velocity measure for the media content exceeds the velocity threshold. The related media may be published on a media outlet such as a website, a blog, an aggregation page, an application, or the like. For example, the related media content may be published on a website that includes a plurality of related media content based on a plurality of original media content.

According to an implementation of the disclosed subject matter, the related media may be any type of media such as a link, an image, a video, an audio, a graphics interchange format, and a text string. A link may be any applicable pointer to another interface such as a web resource identifier (e.g., a uniform resource locator, a uniform resource name, a uniform resource identifier, etc.), or the like. An image may be any applicable format such as a JPEG, a JFIF, an Exif, a TIFF, a RAW, a GIF, a BMP, a PNG, a PPM, a PMG, a PBM, a PNM, a PFM, a PAM, a WEBP, a HDR Raster, a PSD or the like. A video may be any applicable format such as an MPEG, an MPG, an MPE, a MOV, an AVI, a CAM, a DAT, an FLA, a SOL, an M4V, a WMV, or the like. An audio may be any applicable format such as a 3PG, an AIFF, an ATRAC, a M4A an M4P a TTA, a WAV, a WMA or the like. A text format may be any applicable format such as a TXT, a ASC, a CSV, a DOT, a DOTX, a HTML, an ODT, an XPS, and XML, an XHTML, a PDF, or the like. The related media may contain an original media content on which the media content is based on. As an example, an original content may be a video showing a test drive of a new supercar. The related media content may be an article that describes the features and stylistic points of the new supercar. Alternatively or in addition, the related media content may be an article describing the new supercar as well as an embedded version (e.g., embedded into the webpage) of the video. Related media content may be a derivative of corresponding original media content. As an example, original media content may be a recently released song. Related media content corresponding to the recently released song may be a derivative of the song such that the related media may be they lyrics associated with the song. Related media content may be automatically generated or may be provided by a user. As an example, related media content may be automatically generated and may be a link to an original media content such that selection of the link directs a user to the original media content. As another example, the arrangement may automatically extract a video clip and embed the video clip into a webpage other than the original location of the video clip. As an example of user provided related media content, a user may be exposed to media content and, based on the exposure, may draft an article discussing the media content. The drafted article may be the related media content.

As an example of an implementation of the disclosed subject matter, the arrangement may scan a community based website. The arrangement may identify a link to a music video from a comment on the community based website. The arrangement may determine that the link the music video has been shared 100 times within the blog as well as one other social media website that is monitored by the arrangement. Accordingly, the music video may be identified and stored at a remote server, based on the 100 shares. The arrangement may determine a change in engagement rate for the music video by determining the engagement rate for the music video on a first day (say, 2 engages per day) and comparing to the engagement rate for the music video on a second day, say 6 engagements per day. The arrangement may determine that the change in engagement rate is 4 engages per day over that period. Additionally, the arrangement may determine that the highest change in engagement rate for media content during a given week is 6 engages. The music video's change in engagement rate (i.e., 4 engages) may be normalized against the highest change in engagement rate (i.e., 6 engages) to generate a velocity measure of 0.66 for the music video. A velocity threshold of 0.5 may be generated by the arrangement and the music video may exceed the velocity threshold (i.e., 0.66>0.5). Accordingly, the arrangement may publish an article about the music video that contains the music video embedded within the article along with text associated with the music video. The article may be published on a media aggregation website that also contains one or more other related media items such that the one or more other related media items correspond to other media content, the other media content's velocity measure exceeding the velocity threshold (e.g., the same velocity threshold of 0.5 or a different velocity threshold). Essentially, here, the music video may be designated as potentially viral based on exceeding the velocity threshold and publishing the article related to the music video may catalyze the music video becoming viral.

Figure 6:
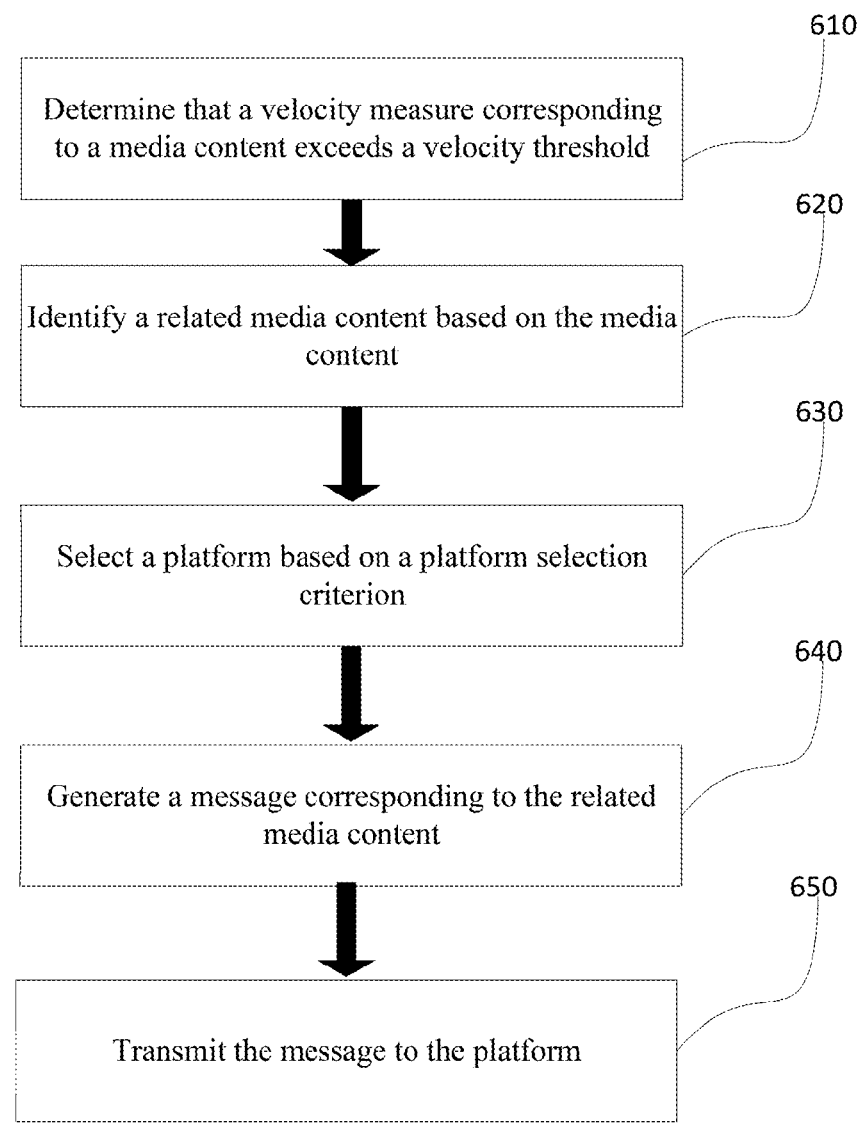
FIG. 6 shows an example process for messaging based on related media content, according to an implementation of the disclosed subject matter.
Figure 7:
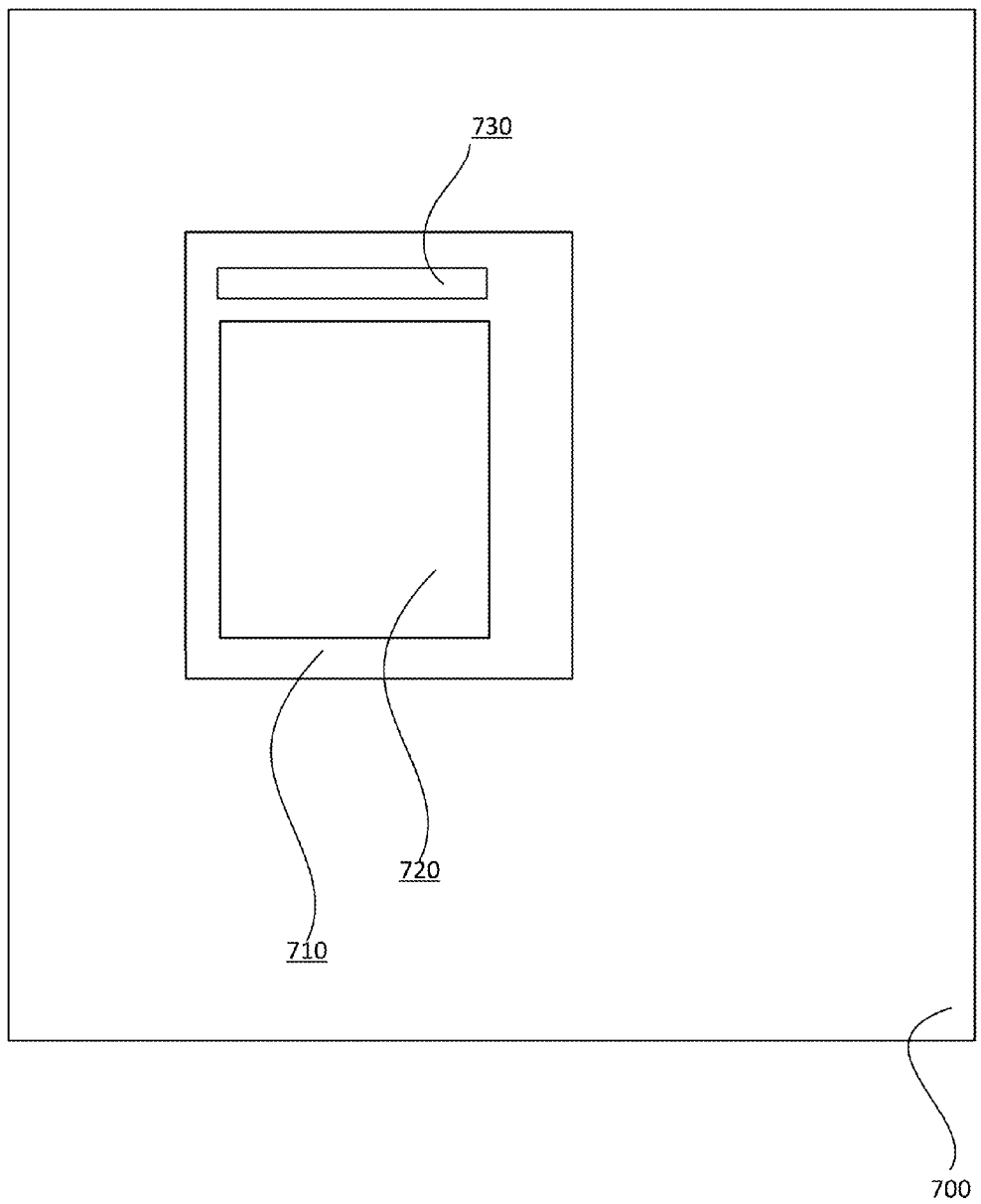
FIG. 7 shows an example illustration of an identifier, according to an implementation of the disclosed subject matter.

According to an implementation of the disclosed subject matter, as shown in FIG. 6, at step 610, the arrangement may determine that a velocity measure corresponding to a media content exceeds a velocity threshold. The velocity measure may be based on a change in engagement corresponding to the media content, as disclosed herein. For example, the velocity measure for an image of a motorcycle may be calculated based on a change from 4 clicks a minute to for the image to 40 clicks a minute, over the course of a day. Accordingly, the rate of change may be higher at a second time (i.e., 40 clicks/minute) than the first time and thus the image may have a positive velocity score. The arrangement may determine that a velocity measure may exceed a velocity threshold, based on the techniques disclosed herein. For example, a user may set the velocity threshold at 4 such that the arrangement may not select media content for which an associated velocity measure is below 4. Media content for which the velocity measure meets a velocity threshold associated may qualify publicized via one or more messages associated with one or more platforms. Additionally, the media content for which the velocity measure exceeds velocity threshold may be designated as potentially viral to a degree where the arrangement determines that the media content should be publicized to one or more users.

According to an implementation of the disclosed subject matter, as shown in FIG. 6, at step 620, the arrangement may identify a related media content based on a media content. As disclosed herein, related media content may be any type of media such as a link, an image, a video, an audio, a graphics interchange format, and a text string. A link may be any applicable pointer to another interface such as a web resource identifier (e.g., a uniform resource locator, a uniform resource name, a uniform resource identifier, etc.), or the like. An image may be any applicable format such as a JPEG, a JFIF, an Exif, a TIFF, a RAW, a GIF, a BMP, a PNG, a PPM, a PMG, a PBM, a PNM, a PFM, a PAM, a WEBP, a HDR Raster, a PSD or the like. A video may be any applicable format such as an MPEG, an MPG, an MPE, a MOV, an AVI, a CAM, a DAT, an FLA, a SOL, an M4V, a WMV, or the like. An audio may be any applicable format such as a 3PG, an AIFF, an ATRAC, a M4A an M4P a TTA, a WAV, a WMA or the like. A text format may be any applicable format such as a TXT, a ASC, a CSV, a DOT, a DOTX, a HTML, an ODT, an XPS, and XML, an XHTML, a PDF, or the like. The related media may contain an original media content on which the media content is based on. As an example, an original content may be a video showing a test drive of a new supercar. The related media content may be an article that describes the features and stylistic points of the new supercar. Alternatively or in addition, the related media content may be an article describing the new supercar as well as an embedded version (e.g., embedded into the webpage) of the video. Related media content may be a derivative of corresponding original media content. As an example, original media content may be a recently released song. Related media content corresponding to the recently released song may be a derivative of the song such that the related media may be they lyrics associated with the song or may be article that discusses the recently released song. Related media content may be automatically generated or may be provided by a user. As an example, related media content may be automatically generated and may be a link to an original media content such that selection of the link directs a user to the original media content. As another example, the arrangement may automatically extract a video clip and embed the video clip into a webpage other than the original location of the video clip. As an example of user-provided related media content, a user may be exposed to media content and, based on the exposure, may draft an article discussing the media content. The drafted article may be the related media content.

As shown at step 630, the arrangement may select a platform based on a platform selection criterion. Selection platform criteria may be any applicable criteria such as a target audience, an advertiser market, a network popularity, an associated cost, a user input, a media type, a geo-location, or the like. Selection platform criteria may enable the arrangement to select one or more platforms to which the arrangement may transmit a message. A single selection platform criterion may be applied to select a single platform. For example, the arrangement may rank a plurality of platforms relative to each other. The platforms may be ranked based on a predetermined formula such that they are ranked based on historical success with a given platform, the success specific to the type of media item (e.g., image, video, text, etc.). Accordingly, a first platform may rank highest and a second platform may rank second highest. The arrangement may select the first platform based on the highest ranking without selecting the second platform. Alternatively, a single selection platform criterion may be applied to select multiple platforms. For example, the arrangement may rank a plurality of platforms relative to each other. The platforms may be ranked based on a dynamic formula such that they are ranked based on predicted success with a given platform, the success specific to the content associated with the media item (e.g., news, music, movies, etc.). A first platform may rank highest and a second platform may rank second highest. The arrangement may be configured to select the top two platforms and, accordingly, both the first platform and the second platform may be selected. Alternatively, or in addition, the arrangement may be configured to select one or more platforms based on a first criterion and one or more platforms based on a second criterion. For example, the arrangement may be configured to select the highest ranking platform based on historical data as well as the highest ranking platform based on a predicted success rate. Accordingly, the arrangement may select two platforms based on the two different criteria.

A target audience may be any applicable subset of a set of people that are to be targeted for receiving a message, as disclosed herein. The target audience may be selected based on user demographic and media interaction level, past success rate (e.g., selection of a link within a message, sharing of a message, etc.), height, weight, technical experience, or the like. As an example, a related media item may be a link to a teen music video. The target audience for the link may be individuals 13-17, that liven in suburban areas, and have previously selected links to music videos via a given platform. Alternatively, the target audience may be adults ages 35-40 that live in suburban areas and may instruct children between 13-17 (e.g., parents, teachers, etc.). The arrangement may select a platform based on target audience such that the probability that a user engages with the message transmitted via the platform is optimal.

An advertiser market may be any applicable subset of a set of markets that may apply promotions along with media content. As an example of an advertiser market applying a promotion, media content may be a video and a related media item may be an article that contains the video. A car company may choose to associate with the related media item and, thus, may provide a promotion link directing a user to the car company's webpage within the article containing the video. A specific advertiser market may benefit from selection of one or more specific platforms and, accordingly, the arrangement may select the one or more specific platforms for the specific advertiser market. As an example, the video camera industry may benefit from associating promotional material with related media content that contains videos. Accordingly, the performance selection criteria may include an advertiser market.

Network popularity may be any applicable preference such as a network traffic base, a network speed, a network exposure, user base, or the like. As an example of a network traffic base, a first social media website may receive an average of 5000 users on a daily basis and a second social media website may receive an average of 7000 users on a daily basis. Accordingly, the second social media website may be more popular and, thus, the arrangement may select the second social media website as the platform via which to message. Similarly, network speed and network exposure may be calculated to determine an optimal platform. A user base may define the type of (e.g., demographic) users in a network and/or the preferences (e.g., media preference, topic preference, etc.) associated with users of a given network. For example, a given platform's user network may generally prefer information related to recently discovered technology. Accordingly, the arrangement may select the given platform when messaging related media content associated with recently discovered technology.

An associated cost may be the amount it costs to message via a platform. The cost may be incurred based on a charge by the platform. As an example, a cellular service provider may charge for each message sent via the cellular service. Alternatively or in addition, the cost may be incurred based on internal procedures. As an example, messages may be sent via a first platform such that minimal bandwidth is required for the transmission. Messages may be sent via a second platform such that a large amount of bandwidth is required for the transmission. Accordingly, it may be cheaper to send messages via the first platform than the second platform.

Platform selection criterion may be based on user input such that a user associated with sending messages and/or a user associated with a platform may provide applicable input. As an example, a user associated with sending messages may provide a ranking of platforms. Accordingly, a higher ranked platform may be more preferable for sending messages. As an example of a user associated with a platform, a social media platform may have a plurality of members. Each of the members may be provided an option of whether or not to receive messages containing related media content. Accordingly, a platform selection criteria may be based on the member selected options.

As an illustrative example, as shown in FIG. 8a, a mobile device user may be presented with a prompt 810 on the mobile device when the user initializes the mobile device. The prompt may ask the user to allow or not allow notifications to be pushed to the user's device by selecting either the "Allow" button 815 or the "Do not allow" button 818. If the user selects the allow button 815, then the user may be provided with messages via the user's device. As another illustrative example, as shown in FIG. 8b, a social media platform may provide a window 820 to a member of the social media platform that asks the user to allow or not allow notifications to be pushed via the social media platform by selecting either the "Allow" button 825 or the "Do not allow" button 828.

Figure 4:
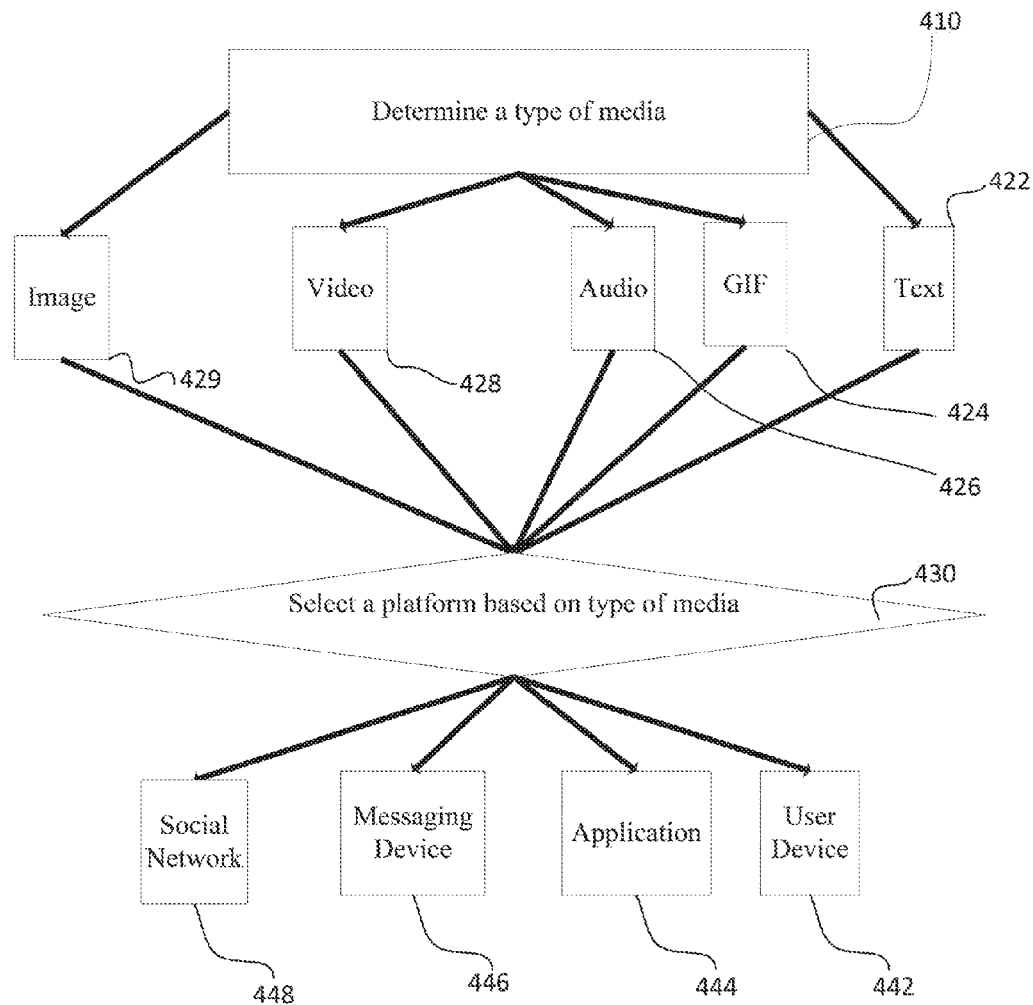
FIG. 4 shows an example illustration for selecting a platform, according to an implementation of the disclosed subject matter.

A media type may be any applicable type such as an image (e.g., a JPEG, PNG, TIF, BMP, etc.), a video (e.g., an MPEG, AVI, MOV, etc.), an audio (e.g., a MP3, MP4, WAV, etc.), a graphics interchange format, a text string (e.g., an article, comment, blog post, an expert, a, paragraph, a sentence, a title, etc.) or the like, as disclosed herein. As an illustrative example, as shown in FIG. 4, the arrangement may determine a type of media at 410. For example, the arrangement may detect that the media type is an image 429, a video 428, an audio 426, a GIF, 424, or a text 422. Based on the determination the arrangement may select a platform based on media type at 430. For example, the arrangement may select from a social network 448, a messaging device 446, an application 444, or a user device. The arrangement may determine that an image is best distributed via a social networking platform and, accordingly, may select the social network platform 448 when the media type is determined to be an image 429.

According to an implementation of the disclosed subject matter, a platform may be selected based on a probability that transmitting a message via a given platform will increase the engagement rate for a corresponding media component. For example, the probability of increasing the engagement rate for a corresponding media component related to exotic cars may be higher for a social media network when compared to a user device. A probability may be determined based on any applicable criteria such as historical data and/or type of media content. As an example of a probability based on historical data, previous transmission of messages on a given platform and resulting effects on velocity measures may be stored. As a specific example, a server may contain information regarding prior messages, containing exotic cars, provided to a first platform and the associated change in engagement rate as a result of the messages. The server may also contain information regarding prior messages, containing exotic cars, provided to a second platform and the associated change in engagement rate as a result of the messages. The associated changes in velocities as a result of the first platform may be compared to the second platform. Accordingly, the arrangement may select the first or second platform based on the comparison. Notably, a significant positive change in an engagement rate may correspond to successful messaging whereas a nominal change in an engagement rate may not correspond to successful messaging. The arrangement may receive an updated engagement rate based on a change in engagement rate for a given media content at a platform.

According to an implementation of the disclosed subject matter, as shown at step 640, the arrangement may generate a message corresponding to a related media content. For example, the message may contain content related to an original media content and may be a derivative of the original content, contain a portion of the original content, contain a link to the original content, or the like. The message may be tailored to a specific platform such as, for example, a platform selected at step 630. A message tailored to a specific platform may be coded in a language decipherable by the specific platform such that the message may be provided to an end user associated with the specific platform in a comprehensible manner. A message may include any applicable media content type such as an image, a video, a text, an audio, and a link. As an example, a message may contain a link to a video as well as text, within the message, that describes the content of the video.

The arrangement may generate a message automatically or a message may be provided by a user. An automatic message may be generated based on a related media content such that the arrangement may input the content of the related media content and output a message for a platform. The automatically generated message may extract predefined content from the related media content. For example, related media content may be a link to a webpage. The automatically generated message may contain the link as well as the title of the corresponding webpage that is extracted by the arrangement. A message provided by a user may be provided in any applicable format such as via a graphical user interface, an application configurable by a user capable of generating messages, or the like. For example, the user may initiate an application on the user's computer and may select components of a related content to be included within a message. The message may subsequently be provided to a corresponding platform.

Additionally, a generated message may contain one or more identifiers. An identifier may identify a user (e.g., a member of a group, a member or a service, etc.), a member, or a group. As an example, an identifier may contain an identification of a member of a social network such that the message is provided to the member in the social network. As another example, an identifier may contain an identification of a member of a social network such that the message is provided to all the members of the social network associated with the identified member. An identifier may contain one or more account credentials corresponding to an account associated with a membership network such as a social network. The account credentials may enable the message to be presented via the membership network such as via a post, share, like, suggestion, link to, or mention.

Alternatively or in addition, an identifier may contain an email address, a telephone number, an online account name, a short messaging service address (SMS), and an application address. Here, an identifier may be used to identify one or more users via any appropriate identification corresponding to the user. As a specific example, a user may be associated with an application account that is identified by an application address. The application address may be, for example, an email address associated with the account. Accordingly, a message may contain the email account associated with the application account and a message containing the email account may be provided to the user via the application, based on the associated email address.

According to an implementation of the disclosed subject matter, at step 650, one or more messages may be transmitted to the selected platform. The transmission may occur via any applicable format such as a physical connection (e.g., a wired connection), or a wireless connection (e.g., a Bluetooth connection, a Wi-Fi connection, a network connection (e.g., (LAN connection, a WAN connection, etc.), a cellular connection, etc.), or the like. A message may be transmitted at any applicable time such as when a message is generated, when a platform is available, during a predefined time period, upon approval from a user, or the like.

According to an implementation of the disclosed subject matter, a second platform may be selected in addition to a first platform based on a platform selection criterion. The platform selection criterion may be different for the selection of the first platform and the second platform or may be the same for the selection of the first and second platform. For example, the selection criteria for selection of the first platform may be based on a type of media whereas the selection criteria for selection of the second platform may be based on an associated cost for messaging via the second platform. A second message corresponding to a related media content may be generated and transmitted to the second platform, according to the techniques disclosed herein. Alternatively or in addition, a message generated based on a first platform may be transmitted to the second platform. For example, an SMS may be generated and transmitted to a user device based on selecting the user device. Here, the user device may be selected based on the probability of a media content associated with the generated SMS having a high probability of resulting in an increased engagement rate for the media content. Additionally, the content of the SMS message may be sent to a user's social media account based on the cost associated with transmitting the message via the social media account.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
    calculating a velocity measure that is based on a change in an engagement rate for a first media content, wherein the calculation is based on one or more weights associated with the engagement rate of the first media content, and wherein the one or more weights associated with the engagement rate are based on a time series for the engagement rate that is based on different types of interactions, where each of the type of interactions are weighted differently;
    determining that the velocity measure corresponding to the first media content exceeds a velocity threshold;
    identifying a second media content based on the first media content, wherein the second media content contains content similar to the first media content;
    selecting a first platform based on at least one platform selection criteria;
    generating a first message corresponding to the second media content;
    transmitting the first message to the first platform; and
    changing at least a portion of the second media content based on the calculated velocity measure,
    wherein the first platform is selected based on a probability that transmitting the first message to the first platform will increase the velocity measure corresponding to the first media content.

2. The method of claim 1, wherein the first media content includes at least one selected from the group consisting of: an image, a video, a text, an audio, and a link.

3. The method of claim 1, wherein the second media content includes at least one selected from the group consisting of: an image, a video, a text, an audio, and a link.

4. The method of claim 1, wherein the second media content is a derivative of the first media content.

5. The method of claim 1, wherein the second media content contains a link to the first media content.

6. The method of claim 1, wherein generating the first message comprises:
    receiving an identifier corresponding to a member of a social network; and
    including the identifier in the first message.

7. The method of claim 1, wherein generating the first message comprises:
    receiving an account credential corresponding to an account on a social network; and
    including the account credential in the first message.

8. The method of claim 1, wherein generating the first message comprises:
    receiving at least one identifier selected from the group consisting of: an email address, a telephone number, an online account name, a short messaging service address, and an application address; and
    including the identifier in the first message.

9. The method of claim 1, wherein the platform is selected from the group consisting of: a social network, a messaging service, an application, and a user device.

10. The method of claim 1, wherein the first message includes the second media content.

11. The method of claim 1, wherein the first platform is identified based on criteria selected from the group consisting of: a target audience, an advertiser market, a network popularity, an associated cost, a user input, a media type, and a geo-location.

12. The method of claim 1, wherein the probability is generated based on historical data.

13. The method of claim 1, wherein the probability is generated based on the type of the first media content.

14. The method of claim 1, further comprising:
    selecting a second platform based on at least one platform selection criteria;
    generating a second message corresponding to the second media; and
    transmitting the second message to the second platform.

15. The method of claim 1, further comprising:
    selecting a second platform based on at least one platform selection criteria; and
    transmitting the first message to the second platform.

16. The method of claim 1, further comprising receiving an updated velocity measure based on a change in engagement rate for the first media content at the first platform.

17. The method of claim 1, wherein the type of engagement rate is based on an action taken with the first media content that is selected from a group consisting of: a click, a share, a like, a suggestion, a post, and a mention.

* * * * *